(No Model.)
I. W. LITCHFIELD.
PAINT CAN.
No. 340,721. Patented Apr. 27, 1886.
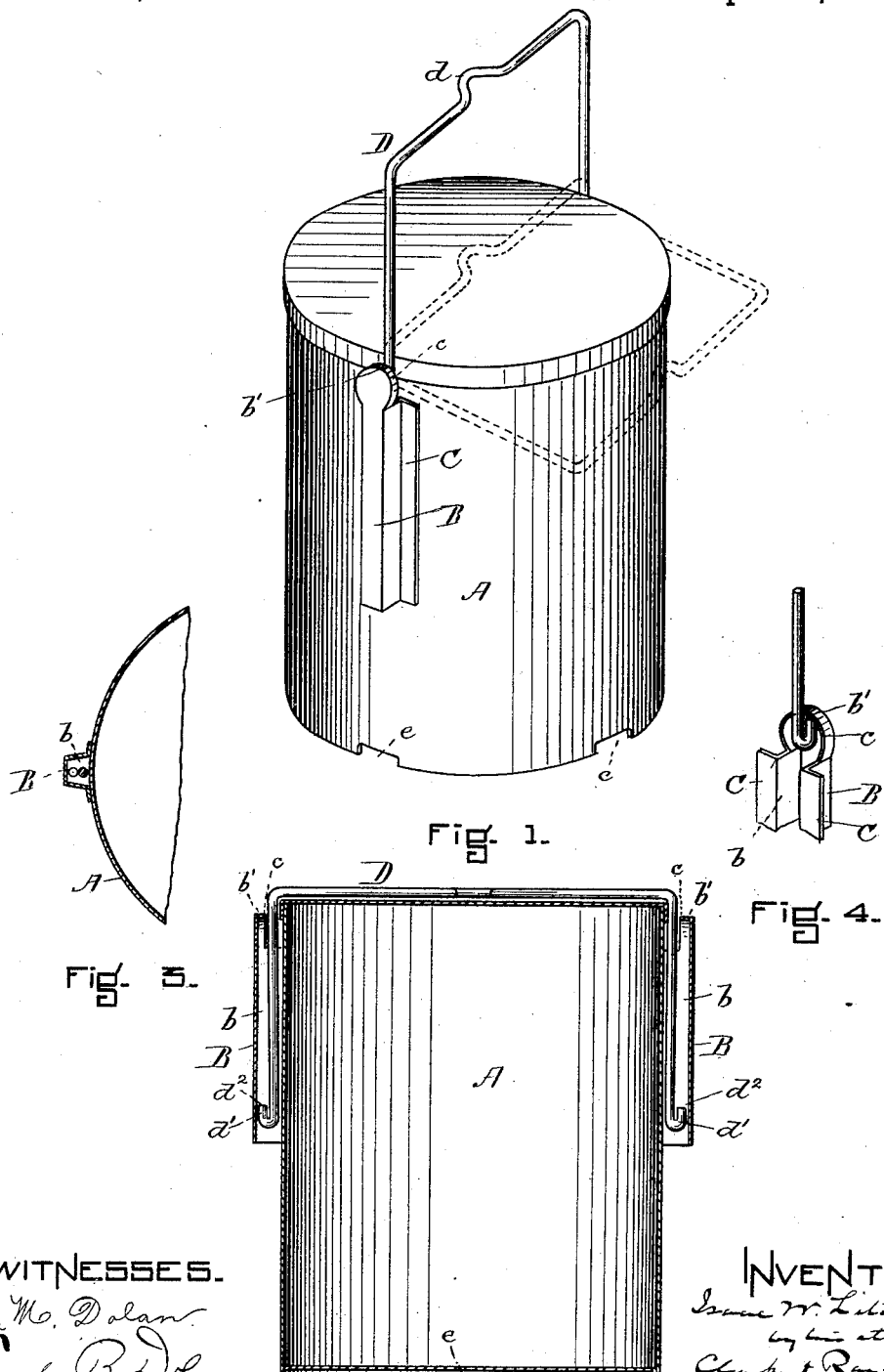

UNITED STATES PATENT OFFICE.

ISAAC W. LITCHFIELD, OF WARWICK, ASSIGNOR OF ONE-HALF TO PHILLIP K. DUMARESQ, OF NEW YORK, N. Y.

PAINT-CAN.

SPECIFICATION forming part of Letters Patent No. 340,721, dated April 27, 1886.

Application filed September 16, 1885. Serial No. 177,236. (No model.)

*To all whom it may concern:*

Be it known that I, ISAAC W. LITCHFIELD, of Warwick, in the county of Orange and State of New York, a citizen of the United States, have invented a new and useful Improvement in Paint-Cans, of which the following is a full, clear, and exact description, reference being had to the accompanying drawings, forming a part of this specification, in explaining its nature, in which—

Figure 1 is a view in perspective of a paint-can having the features of my invention. Fig. 2 is a vertical central section thereof. Figs. 3 and 4 are detail views, to which reference is hereinafter made.

The object of the invention is to provide the cans in which paint is put up for sale and transportation with a bail of peculiar construction and character, whereby the can, by the removal of the top, may be used as a paint-pot, and the bail serve not only in handling the can, but also to make the can more serviceable as a pot. It is necessary, however, that the bail should be so attached to the can as to enable the cans to be properly packed for transportation and storage. To accomplish this I provide the can A with the long metal boxes B, which are shaped to provide the recesses $b$, in which the ends of the bail D are movable, and also with the ears $b'$, against which the ends of the bail are brought in contact when it is brought into practical use. I prefer to make these boxes of sheet metal bent to form edges or flanges C, by which they are secured by solder, or in any other desirable way, to the sides of the can, and also form the passage $b$. The upper end of each of these boxes has a flange, $c$, projecting inward to form the ear for the bail end. The bail preferably is made of wire and has the curved section $d$, and its ends $d'$ are bent back upon themselves to form the enlargement or shoulders $d^2$, which come in contact with the flanges $c$ of the ears when the bail is lifted to the position shown in Fig. 1.

When the bail is not used for carrying the can, it is pushed down so that its upper cross-piece bears upon the top of the can, and the side portions are inclosed by the boxes.

In order that the cans may pack well, I form the bottom of each can with a recess, preferably stamped therein, of a shape to cover or contain the portion of the bail extending above the top of the can when in the position shown in Fig. 2, or of the full size of the can-bottom, as shown in Fig. 1, and remove sections $e$ of the casing. By thus shaping the bottom of the can it is obvious that one can may be placed upon another, the bail of one can being inclosed or covered by the recess in the bottom of the next above. It is also obvious that the bail can be used, when the can is employed as a pot, as a rest for the painter's brush.

I would say that I do not confine my invention to paint cans, but may employ it in cans for any other purpose where it can be used to advantage.

Having thus fully described my invention, I claim and desire to secure by Letters Patent of the United States—

1. The combination of the boxes B, having the spaces $b$, the ears $b'$, and the bail D, having the shoulders $d^2$ upon its ends, whereby the bail is adapted to be moved vertically from an operative to an inoperative position, all substantially as described.

2. The can A, provided with the vertically-movable bail D, and the recess upon its under surface for receiving the bail of another can, as and for the purposes described.

ISAAC W. LITCHFIELD.

Witnesses:
P. K. DUMARESQ,
CHAS. F. KURZ.